(No Model.)

F. A. REIHER.
SET SCREW.

No. 315,839.   Patented Apr. 14, 1885.

Witnesses:
Chas. E. Gaylord.
Flora L. Brown.

Inventor:
Frank A. Reiher,
By Charles T. Brown,
Attorney.

UNITED STATES PATENT OFFICE.

FRANK A. REIHER, OF CHICAGO, ILLINOIS.

SET-SCREW.

SPECIFICATION forming part of Letters Patent No. 315,839, dated April 14, 1885.

Application filed November 19, 1884. (No model.)

*To all whom it may concern:*

Be it known that I, FRANK A. REIHER, a citizen of the United States, residing at Chicago, in the county of Cook and State of Illinois, have invented certain new and useful Improvements in Set-Screws, of which the following is a specification.

My invention relates to that class of set-screws in which a male screw having a head or handle of convenient form, and fitting into a corresponding female screw, may be turned down upon or screwed against a rod or wire passing through the base in which said female screw is cut, perpendicular to said male and female screw, and thus "set" said rod or wire in said base and hold the same firmly; and the object which I seek to attain is to provide means whereby the said male screw is prevented from being entirely removed from said female screw when the rod or wire upon which said male screw is set is in position to be acted upon or held firmly in position thereby, while by the use of my invention, when the said rod or wire is not in position to be so acted upon and held by said male screw, the same may be removed readily from said female screw; and, further, I seek to secure the advantages or objects above set forth in a manner that will not require the use of malleable metal in the manufacture of said male or female screw, or in the head or handle of said male screw, or in the base in which said female screw is placed.

Figure 1:
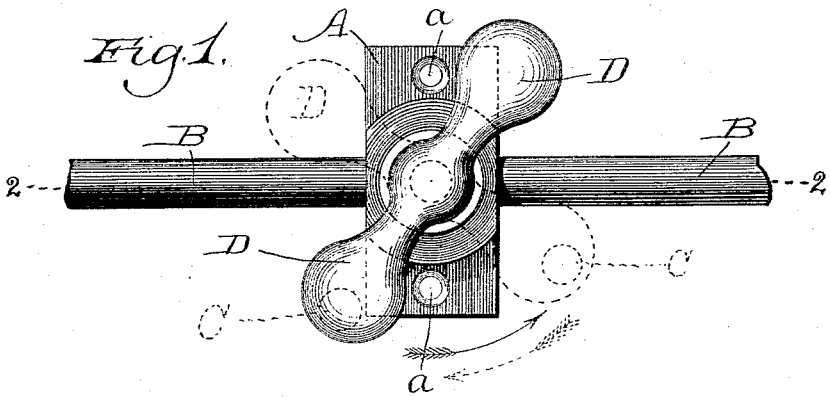
Figure 2:
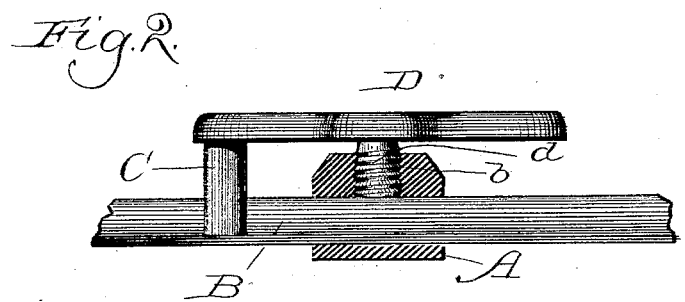
Figure 3:
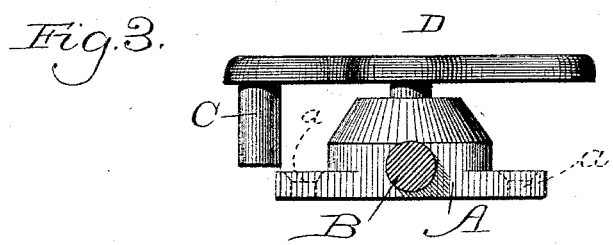

I have illustrated my invention by the drawings accompanying this specification, in which Figure 1 is a plan of my invention. Fig. 2 is a cross-section of the same on line 2 2 of Fig. 1, showing head or handle. Fig. 3 is a cross-section.

A is the base. B is a rod or wire passing through base A. *b* is a female screw perpendicular to rod or wire B, or the hole in which rod or wire B is inserted. *a a* are holes in base A, by means of which it is secured or fastened to a table, bench, or other object. C is a lug or post on head or handle D of male screw *d*.

The manner in which my improved set-screw operates is as follows: Male screw *d* is inserted in female screw *b* and turned or screwed in to about the position illustrated by the dotted lines in Fig. 1. Rod or wire B is then inserted in base A. Male screw *d* may now be turned in the direction indicated by the dotted arrow in Fig. 1 until the same is screwed firmly against rod or wire B, thus "setting" said rod or wire and said male screw against the same. This result is attained when the handle D is in the position illustrated in Fig. 1.

In order to loosen the set-screw to permit the rod or wire B to be moved or withdrawn, male screw *d* is turned in the direction indicated by the arrow in Fig. 1 by means of head or handle D, and may be turned in this direction until lug or bolt C strikes against rod or wire B so long as said wire is inserted in said base A; but when said rod or wire B is entirely withdrawn from said base male screw *d* may be turned by said handle D until entirely released from female screw *b*.

It will readily be seen that so long as rod or wire B is inserted in base A in a position to be acted upon by male screw *d*, said male screw cannot be separated from or screwed out of female screw *b*; but by withdrawing said rod from base A the two may be easily separated in the ordinary way.

In order to allow for the ordinary wear of screws *b* and *d*, head D, having lug or bolt C placed thereon and integral therewith, is placed or cast upon said screw *d* in such a position that said handle or head D is in the position shown in Fig. 1, when said screw *d* is turned firmly down upon rod or wire B, setting said rod and screw firmly in position.

Having thus described my invention, its construction and operation, what I claim, and desire to secure by Letters Patent, is—

1. Male screw *d*, having head D, with lug or bolt C cast thereon or firmly secured thereto, in combination with female screw *b* in base A, having hole adapted to receive rod B, substantially as described, and for the purpose set forth.

2. A base having a hole adapted to receive and guide a rod therein, and a second hole perpendicular thereto and having a female screw cut therein, in combination with a male screw fitting therein, and having a head or handle thereon with a lug or bolt attached thereto, the whole forming a set-screw, all substantially as described, and for the purpose set forth.

3. Male screw $d$, head D, and lug C in a set-screw, in combination with female screw $b$, base A, and rod B, all substantially as described, and for the purpose set forth.

FRANK A. REIHER.

In presence of—
F. L. BROWN,
H. M. COLLYER.